United States Patent
Weinstein et al.

[11] Patent Number: 6,095,735
[45] Date of Patent: Aug. 1, 2000

[54] LOCKING NUT ASSEMBLY

[76] Inventors: Leslie J. Weinstein, 4911 Parkwood St., Boise, Id. 83704; Erik R. Meinikheim, 10300 Jay Rd., Boise, Id. 83703; Gary W. Scott, 3374 Chickory Way, Boise, Id. 83706

[21] Appl. No.: 09/337,385

[22] Filed: Jun. 21, 1999

[51] Int. Cl.[7] .................. F16B 39/04; F16B 39/10
[52] U.S. Cl. ............. 411/221; 411/197; 411/209; 411/945
[58] Field of Search ................... 411/197, 199, 411/200, 209–211, 221, 945, 946

[56] References Cited

U.S. PATENT DOCUMENTS

| | | | |
|---|---|---|---|
| 976,928 | 11/1910 | Salisbury | 411/221 |
| 1,440,938 | 1/1923 | Sieroslawski | 411/221 |
| 1,491,163 | 4/1924 | Osenkowski | 411/221 |
| 4,906,150 | 3/1990 | Bennett | 411/119 |
| 5,395,192 | 3/1995 | Bennett | 411/120 |
| 5,674,034 | 10/1997 | Bennett | 411/197 |

FOREIGN PATENT DOCUMENTS

| | | | |
|---|---|---|---|
| 540815 | 12/1931 | Germany | 411/221 |
| 220816 | 7/1942 | Switzerland | 411/221 |
| 110647 | 11/1917 | United Kingdom | 411/221 |

*Primary Examiner*—Neill Wilson
*Attorney, Agent, or Firm*—Joseph W. Holland

[57] ABSTRACT

A locking nut assembly for use on a shaft having a longitudinally extending channel. The locking nut assembly includes a nut having an annular portion with a slot extending radially through the annular portion. The locking nut assembly also includes a lock plate having an opening therein through which the annular portion of the nut is received and a tab which projects through the slot in the nut and into the channel on the shaft when the assembly is installed on the shaft prohibiting rotation of the nut. A retainer retains the lock plate on the nut.

21 Claims, 2 Drawing Sheets

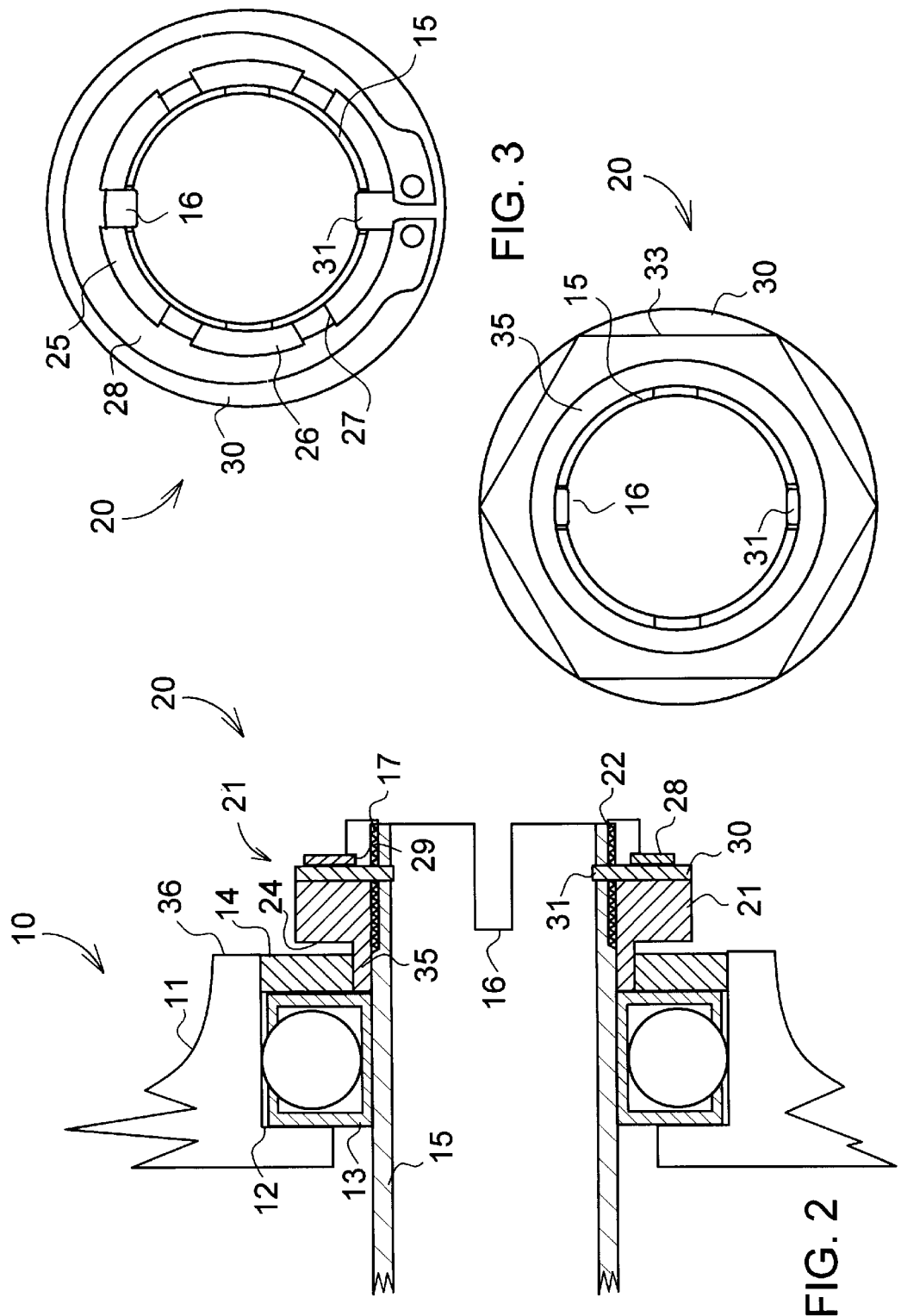

LOCKING NUT ASSEMBLY

BACKGROUND OF THE INVENTION

1. Technical Field

The present invention relates generally to locking fasteners, and more particularly to a locking nut assembly for use on a shaft for retaining a rotating or a rotatable member.

2. Background

Locking nut assemblies are employed generally to provide a more secure means of retaining a variety of mechanical parts commonly in situations where such parts are subject to rotation, vibration or other mechanical forces. Generally speaking, the greater the forces applied against a part retained, the more advantageous it is or becomes to retain the part employing a locking nut assembly. A locking nut assembly typically includes a threaded nut together with a means for limiting rotation of the nut along a thread once the nut has been tightened to a selected torque. A locking nut assembly may be used to secure a rotatable member on a shaft, spindle, axle or other member. A lock nut assembly may also be used for retaining a rotatable member including a wheel assembly on a shaft. The wheel assembly may include a bearing and/or a seal both mountable on the shaft within a race.

A combination including a castle nut and a cotter pin has been widely used in applications of these sorts, however in certain applications a greater degree of security and a lower incidence of failure may be desired. A variety of alternate solutions have been suggested in the prior art yet each of these have their limitations and shortcomings. Devices disclosed in the prior art tend towards elaborate designs and hence are presumably expensive to manufacture. The devices typically include more parts than the locking nut assembly of the present invention or require parts extraneous to the locking nut assembly to achieve the primary objective of the assembly, securing the nut from rotation and therefore, the associated part or parts on a shaft.

It is therefore a general objective of the present invention to provide an improved locking nut assembly which is suitable for retaining a rotatable member on a shaft or spindle. Additionally, it is an objective of the present invention to provide a system for mounting a rotatable member including a wheel assembly on a shaft, the system including an improved locking nut assembly.

SUMMARY OF THE INVENTION

These and other objects are achieved by a locking nut assembly for use on a shaft having a longitudinally extending channel, the locking nut assembly includes a nut having an annular portion with a slot extending radially through the annular portion.

The locking nut assembly also includes a lock plate having an opening therein through which the annular portion of the nut is received and a tab projecting through the slot in the nut and into the channel on the shaft when the assembly is installed on the shaft. A retainer retains the lock plate on the nut.

The shaft may be configured as either as a solid cylindrical member of a hollow tubular member. In the case that the shaft is configured as a solid cylindrical member, the longitudinally extending channel may be configured as a keyway having a variety of configurations. In the case that the shaft is configured as a hollow tubular member, the longitudinally extending channel may be configured as a slot that may extend through the tube wall.

In one embodiment of the invention, the annular crown extends from one face of the nut and is configured to include a slot formed through the annular crown from an outer periphery to the inner periphery of the annular crown. The nut may also include a torquing portion adapted to permit rotation of the nut by hand or with the aid of a tool. A wide variety of configurations are known including knurled surfaces, multi-sided configurations, i.e. hexagonal configurations, star configurations and the like. Additionally, torquing may be accommodated employing a variety of other configurations are known to those skilled in the art including holes for spanner wrenches or notches for hook wrenches.

The nut may be configured having an annular bearing set formed on the second face of the nut. The annular bearing set may be configured having a preselected height such that when the nut is threaded on the shaft, the bearing assembly will be seated upon a first installation of the bearing assembly in the bearing seat by means of the annular bearing set driving the bearing assembly firmly against the bearing seat.

In one embodiment of the invention, the lock plate is configured as a washer having a ring portion and a tab which extends radially from the ring portion. The tab is of sufficient length to extend through the slot formed in the nut engaging the longitudinally extending channel. One embodiment of the invention includes a lock plate having a plurality of tabs extending radially from the ring portion of the lock plate.

In one embodiment of the invention, the retainer includes a snap ring and a ring groove formed in the annular crown for receiving the snap ring. The retainer may alternately be configured as an e-clip, a c-clip, a spiral retainer or a pin.

It will be appreciated by those skilled in the art that the various component parts of the locking nut assembly according to the present invention may be formed of a variety of materials including metals and plastics.

One embodiment of the invention includes a hub assembly for mounting a rotatable part on a shaft, including a longitudinally extending channel, for instance a wheel assembly on an axle or spindle or the like. The hub assembly may include a bearing seat and a bearing assembly positioned within the bearing seat. The hub assembly includes a locking nut assembly according to the present invention for securing the rotatable part on the shaft.

Additional advantages and novel features of the invention will be set forth in part in the description that follows, and in part will become apparent to those skilled in the art upon examination of the following, or may be learned by practice of the invention. Additionally, the advantages of the invention may be realized and attained by means of the instrumentalities and combinations particularly pointed out in the appended claims.

BRIEF DESCRIPTION OF DRAWINGS

FIG. 2 is a representational side sectional view of a wheel member assembly according to the present invention;

FIG. 3 is a front representational view of a locking nut assembly according to the present invention; and FIG. 4 is a rear representational view of a locking nut assembly according to the present invention.

DETAILED DESCRIPTION OF THE INVENTION

Figure 1:
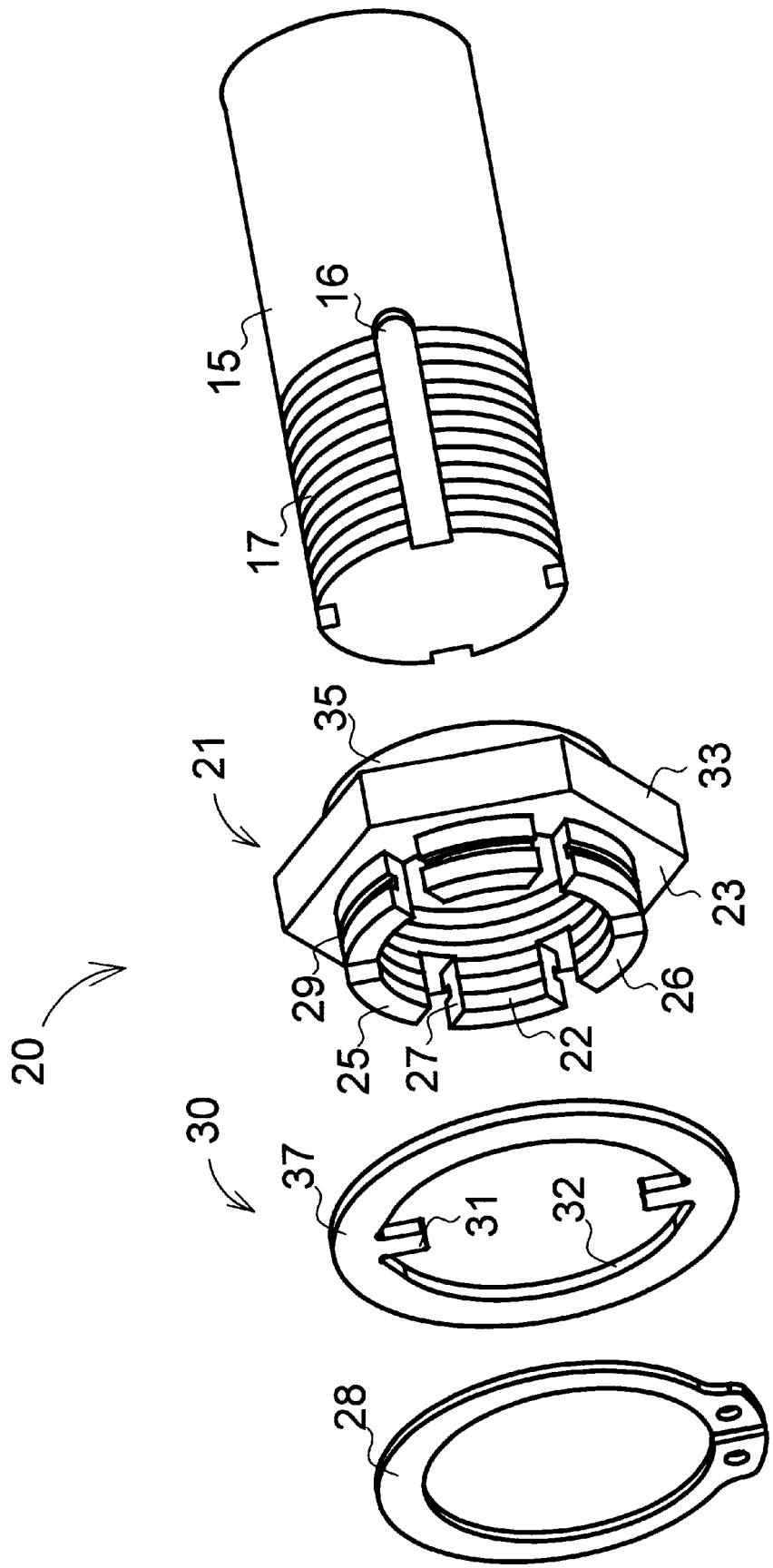
FIG. 1 is a an exploded perspective representational view of a locking nut assembly according to the present invention.

Referring to FIG. 1, a perspective representation of one embodiment of locking nut assembly 20 is shown. Locking nut assembly 20 includes nut 21 having hex portion 33. While nut 21 is shown including hex portion 33 it should be appreciated that any suitable torquing portion would be acceptable in practicing the invention. Nut 21 also includes first face 23 and second face 24 (shown in FIG. 2). Nut 21 includes annular portion 25 extending away from first face 23. Slots 27 are defined by fingers 26 and extend through annular portion 25 from the outer periphery through to the inner periphery. As shown in FIG. 1, annular portion 25 includes a plurality of slots 27 formed at intervals between a plurality of fingers 26.

Nut 21 as shown in FIG. 1 also includes annular bearing set 35 which will be discussed in further detail below. Also shown in FIG. 1 is shaft 15 having longitudinally extending channel 16 with an external thread 17 cut along the shaft 15 for threadedly engaging internal thread 22 of nut 21.

Ring groove 29 in fingers 26 extends around the outer periphery of annular portion 25. Groove 29 may be formed in a variety of ways depending upon the materials employed for forming nut 21.

As shown in FIG. 1, locking nut assembly 20 also includes lock plate 30 including ring portion 21 defining an aperture and tabs 31 which extends radially in this case from inner aperture face 32. Lock plate 30 is formed and configured to permit placement on shaft 15 such that tabs 31 extends through slot 27 of nut 21, with the distal end of tabs 31 extending into longitudinally extending channel 16 of shaft 15.

Locking nut assembly 20 also includes snap ring 28 which is removably engageable within ring groove 29.

Referring to FIG. 2, hub assembly 10 is shown including hub 11 which is configured to include bearing seat 12. Locking nut assembly 20 is shown securing hub assembly 10 on shaft 15.

Locking nut assembly 20 is shown including nut 21 having internal thread 22. Slots 27 extend radially between fingers 26. Nut assembly 20 is shown threadedly engaging shaft 15 along external thread 17 and internal thread 22. Nut 21 is configured in the embodiment shown in FIG. 2 to include annular bearing set 35. As shown in FIG. 2, as nut 21 advances along the cooperating threads, external thread 17 and internal thread 22, annular bearing set 35 exerts a force against bearing assembly 13 advancing bearing assembly 13 until it is seated in bearing seat 12. Annular bearing set 35 may be configured having a variety of depths, such that an adjustment for thrust may be effectively measured as the gap between second face 24 of nut 21 and a fixed reference point such as hub face 36.

Locking nut assembly 20 also includes lock plate 30 having tabs 31. Snap ring 28 removably engages ring groove 29 to secure nut assembly 20 on shaft 15 during use. Also shown in FIG. 2 is slot 27 formed between alternating fingers 26.

Referring to FIG. 3, locking nut assembly 20 is shown in a front view. FIG. 3 shows to advantage annular portion 25 including fingers 26 and slots 27 arranged at alternating intervals. Also shown in FIG. 3 is lock plate 30 including tabs 31 extending radially into longitudinally extending channel 16 of shaft 15. Lock plate 30 is retained on locking nut assembly 20 by snap ring 28.

FIG. 4 shows a rear perspective view of locking nut assembly 20 including annular bearing set extending substantially perpendicularly from second face 24. Also shown in FIG. 4 is lock plate 30 including tabs 31 extending into channel 16 of shaft 15.

It is to be understood that the invention is not limited to the embodiment shown and described above. Various other embodiments of the invention may be made and practiced without departing from the scope of the invention, as defined in the following claims.

We claim:

1. A locking nut assembly for use on a shaft having a longitudinally extending channel, the locking nut assembly comprising:

a nut having an annular portion and a slot extending radially through the annular portion;

a lock plate having an opening therein through which the annular portion of the nut is received and a tab projecting radially through the slot in the nut and into the channel on the shaft when the assembly is installed on the shaft;

a retainer including a snap ring and a snap ring groove formed on the annular portion for receiving the snap ring retaining the lock plate between the snap ring and a first face of the nut.

2. The locking nut assembly of claim 1, wherein the annular portion includes a plurality of fingers defining a plurality of radially extending slots.

3. The locking nut assembly of claim 1, wherein the nut further comprises a torquing portion.

4. The locking nut assembly of claim 1, wherein the nut further comprises an annular bearing set.

5. A locking nut assembly for use on a shaft having a plurality of longitudinally extending channels, the locking nut assembly comprising:

a nut having an annular portion and a plurality of slots extending radially through and spaced around the annular portion of the nut;

a lock plate having an opening therein through which the annular portion of the nut is received and a plurality of tabs projecting radially through slots in the nut and into channels on the shaft when the assembly is installed on the shaft;

a retainer including a snap ring and a snap ring groove formed on the annular portion for receiving the snap ring for retaining the lock plate between the snap ring and a first face of the nut retaining the lock plate on the nut.

6. A locking nut assembly for use on a shaft having a plurality of longitudinally extending channels, the locking nut assembly comprising:

a nut having an annular portion and a plurality of slots extending radially through and spaced around the annular portion of the nut;

a lock plate having an opening therein through which the annular portion of the nut is received and a plurality of tabs projecting radially through slots in the nut and into channels on the shaft when the assembly is installed on the shaft;

a retainer retaining the lock plate on the nut.

7. The hub assembly of claim 6 wherein the shaft further comprises a plurality longitudinally extending channels.

8. The hub assembly of claim 6 wherein the annular crown further comprises a plurality of fingers extending from the first face of the nut forming a plurality of slots between the plurality of fingers.

9. The hub assembly of claim 6 wherein the annular crown further comprises a slot formed and extending radially through the annular crown.

10. The hub assembly of claim 6 wherein the annular crown further comprises a ring groove formed on the annular crown.

11. The hub assembly of claim 6 wherein the lock plate further comprises a tab extending radially from the ring portion.

12. The hub assembly of claim 6 wherein the lock plate further comprises a plurality of tabs extending radially from the ring portion.

13. The hub assembly of claim 6 wherein the hub further comprises an annular bearing set.

14. A locking nut assembly for use on a threaded shaft including a longitudinally extending channel, comprising:

a nut characterized by an outer periphery and a threaded inner periphery, the nut having a slot therein extending radially through the nut from the outer periphery to the inner periphery;

a locking member having an opening therein through which the nut is received and a key projecting radially into the opening and through the slot in the nut, the key projecting a sufficient distance into the opening to extend through the slot in the nut and into the longitudinally extending channel when the assembly is installed on the shaft; and a retainer including a snap ring and a snap ring groove formed on the annular portion for receiving the snap ring for retaining the lock plate between the snap ring and a first face of the nut retaining the lock member on the nut when the assembly is installed on the shaft.

15. The locking nut assembly of claim 14, wherein the longitudinally extending channel comprises a keyway, the locking member is a plate, and the key is an inwardly projecting tab configured to project into the channel in the shaft.

16. The locking nut assembly of claim 14, wherein the outer periphery of the nut is non-circular.

17. The locking nut assembly of claim 14, wherein the slot in the nut extends only part of the length of the nut.

18. A locking nut assembly for use on a shaft having a longitudinally extending channel, the locking nut assembly comprising:

a nut having an annular portion and a slot extending radially through the annular portion;

a lock plate having an opening therein through which the annular portion of the nut is received and a tab projecting radially through the slot in the nut and into the channel on the shaft when the assembly is installed on the shaft;

a retainer including an e-clip and an e-clip groove formed on the annular portion for receiving the e-clip for retaining the lock plate between the an e-clip and a first face of the nut.

19. A locking nut assembly for use on a shaft having a longitudinally extending channel, the locking nut assembly comprising:

a nut having an annular portion and a slot extending radially through the annular portion;

a lock plate having an opening therein through which the annular portion of the nut is received and a tab projecting radially through the slot in the nut and into the channel on the shaft when the assembly is installed on the shaft;

a retainer including a c-clip and a c-clip groove formed on the annular portion for receiving the c-clip for retaining the lock plate between the c-clip and a first face of the nut.

20. A locking nut assembly for use on a shaft having a longitudinally extending channel, the locking nut assembly comprising:

a nut having an annular portion and a slot extending radially through the annular portion;

a lock plate having an opening therein through which the annular portion of the nut is received and a tab projecting radially through the slot in the nut and into the channel on the shaft when the assembly is installed on the shaft;

a retainer including a spiral retainer and a spiral retainer groove formed on the annular portion for receiving the spiral retainer for retaining the lock plate between the spiral retainer and a first face of the nut.

21. A locking nut assembly for use on a shaft having a longitudinally extending channel, the locking nut assembly comprising:

a nut having an annular portion and a slot extending radially through the annular portion;

a lock plate having an opening therein through which the annular portion of the nut is received and a tab projecting radially through the slot in the nut and into the channel on the shaft when the assembly is installed on the shaft;

a retainer including a pin and an aperture formed through the annular portion for receiving the pin for retaining the lock plate between the pin and a first face of the nut.

* * * * *